Nov. 23, 1943. E. J. TATE 2,335,217
COOKING GRILL
Filed May 23, 1941 2 Sheets-Sheet 1
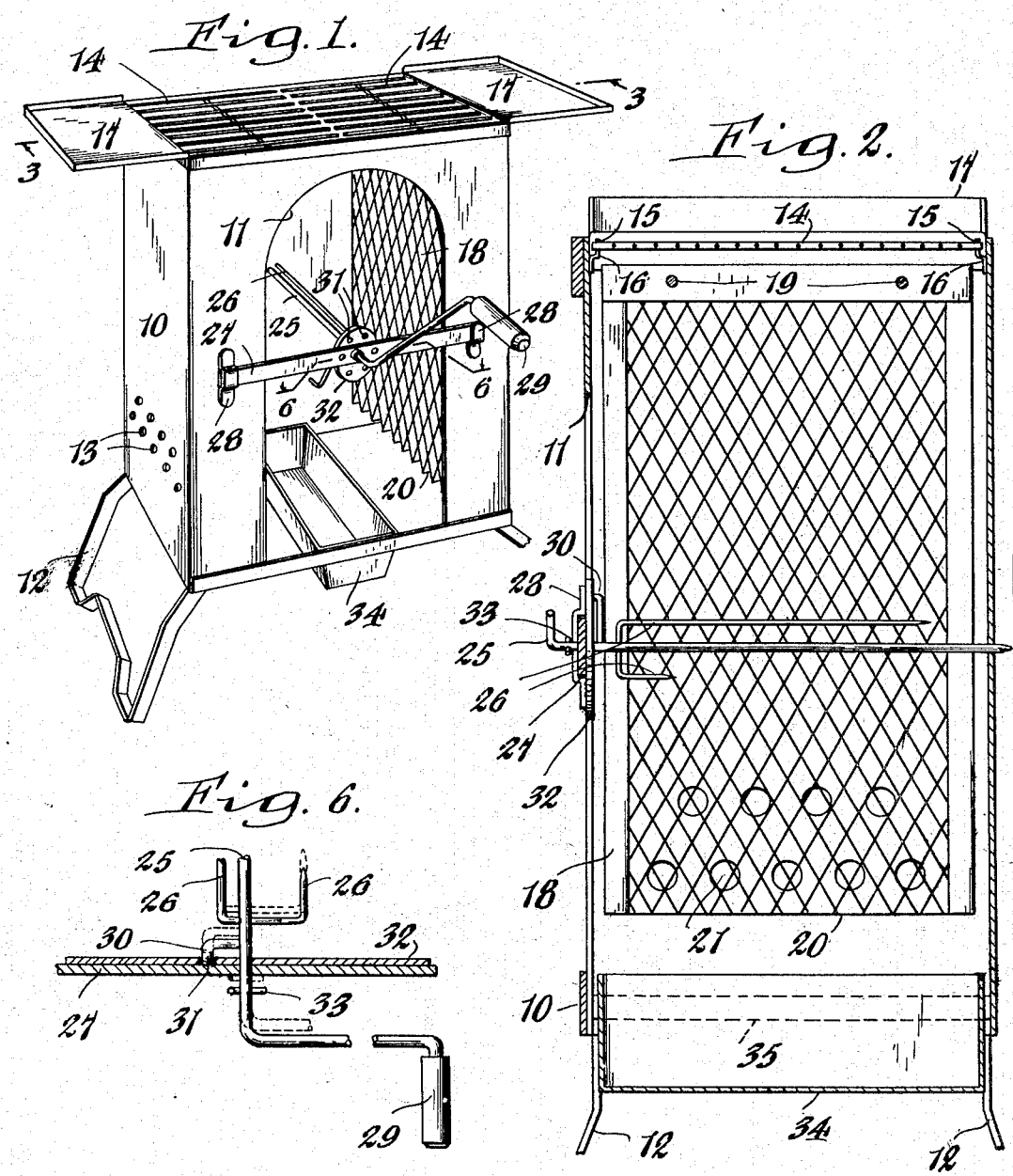
Inventor,
Edward J. Tate,
by Walter P. Guyer
Attorney.

Nov. 23, 1943.  E. J. TATE  2,335,217
COOKING GRILL
Filed May 23, 1941  2 Sheets-Sheet 2
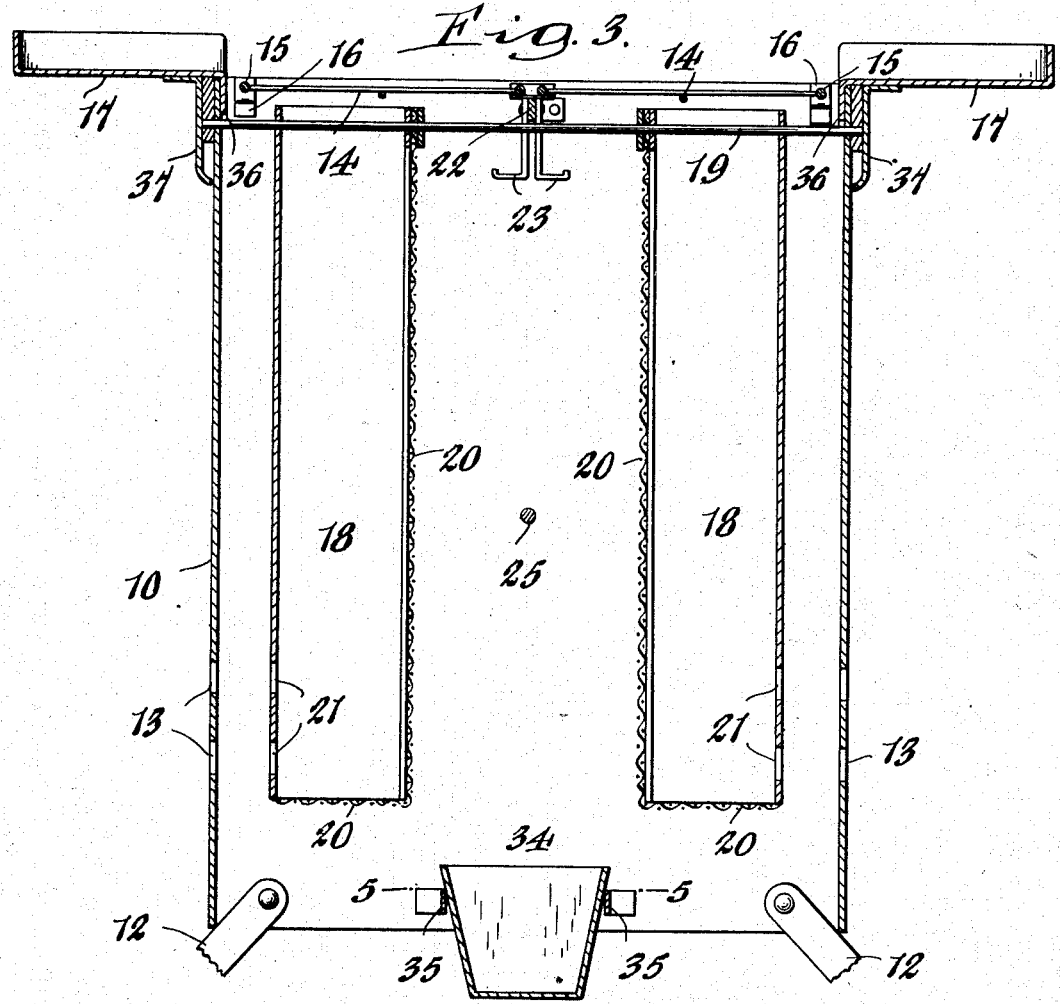
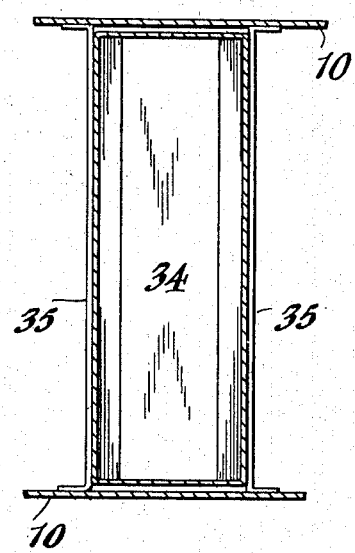
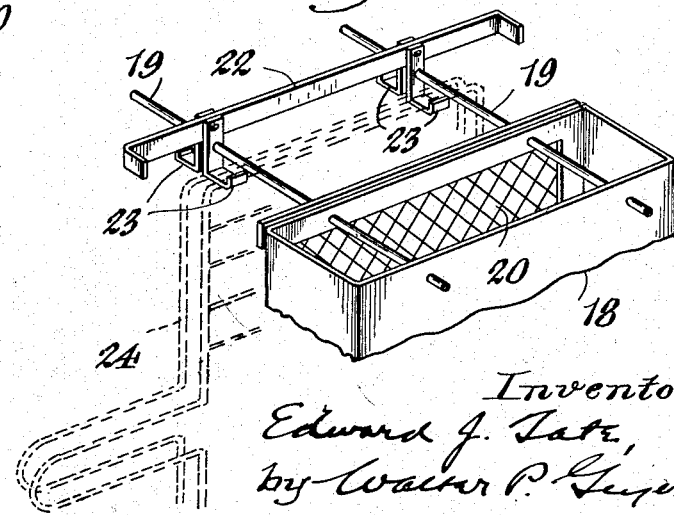
Inventor,
Edward J. Tate,
by Walter P. Guyer
Attorney.

Patented Nov. 23, 1943

2,335,217

UNITED STATES PATENT OFFICE 2,335,217

COOKING GRILL

Edward J. Tate, Buffalo, N. Y., assignor to Master Metal Products, Inc., Buffalo, N. Y., a corporation of New York Application May 23, 1941, Serial No. 394,868

1 Claim. (Cl. 126—14)

This invention relates to certain new and useful improvements in cooking or barbecue grills.

It has for one of its objects to provide a portable grill of this character which is designed for use out-of-doors or indoors and which is particularly efficient in the broiling of steaks, chops, etc., or for the barbecuing of roasts, fowl and game.

Another object is to provide a self-contained charcoal grill having dual fire compartments which are adjustable to control the amount of heat desired to suit a given cooking operation.

A still further object is to provide a portable grill of this character which is compact and inexpensive in construction, which is efficient in use, and which is provided with a novel revolving spit device for use in the barbecuing of meats.

Other features of the invention reside in the construction and arrangement of parts hereinafter described, and particularly pointed out in the appended claim.

In the accompanying drawings:

Figure 1 is a perspective view of the grill embodying my invention. Figure 2 is an enlarged transverse vertical section thereof taken centrally through the grill. Figure 3 is an enlarged vertical section taken in the plane of line 3—3, Figure 1. Figure 4 is a fragmentary perspective view of one of the fuel compartments and the supports from which it is suspended. Figure 5 is a horizontal section taken on line 5—5, Figure 3. Figure 6 is an enlarged fragmentary horizontal section taken in the plane of line 6—6, Figure 1.

Similar characters of reference indicate corresponding parts throughout the several views.

This improved portable grill, which may be used either outdoors or indoors by installation in a fireplace, consists of a sheet metal housing 10 of substantially rectangular form which is open at its top and bottom and closed at its front, rear and sides and with the exception of an opening 11 in its front wall for the insertion and removal of the food to be cooked or barbecued. At its lower end the housing is provided with supporting legs 12 whereby the grill is supported above the ground. In practice, an ash pan (not shown) is placed beneath the open bottom of the grill to give full protection to lawn, fireplace, hearth or floor.

The interior of this housing constitutes a combustion and cooking chamber and its end walls adjacent the bottom thereof are provided with draft openings 13, while the open top thereof is provided with foldable grid sections 14 which are hinged at their outer ends as indicated at 15 to brackets 16 applied to the adjoining upper end of the front and rear walls of the housing. These grid sections are normally used for cooking pan foods, coffee, etc., and can be opened upwardly to expose the upper end of the housing for purposes which will hereinafter appear. At its upper end and adjacent opposite sides thereof the grill housing is provided with detachable warming shelves 17. These shelves, in addition to serving as warming shelves, also provide the necessary extra space for accessories such as salt, pepper and the like.

Suspended within the housing 10 at opposite sides of the front opening 11 thereof are dual or twin fire compartments 18 for receiving the charcoal or other fuel, these compartments being slidably mounted at their upper ends on parallel supporting rods 19 extending from side to side of the housing for readily adjusting them toward and from each other or to and away from the meat being cooked in the center or cooking chamber of the grill and thereby assure a positive and simple heat control in the broiling or cooking operation. Each of these fuel compartments extends substantially the full height and depth of the grill housing and is open at its upper end to readily permit the charging thereof with fuel, while the inner side and bottom of each compartment is constructed of foraminous material to provide grates 20. The end and outer walls of these fuel compartments are preferably made of sheet metal and the outer wall has draft openings 21 therein which are substantially in alinement with the companion draft openings 13 formed in the opposite side walls of the housing.

At its upper end and substantially centrally thereof, the housing 10 is provided with a cross bar 22 secured at its ends to the front and rear housing-walls and having hooks 23 thereon from which a steak broiler 24 is adapted to be removably hung in position between the twin fire compartments 18.

Removably mounted on the grill and interchangeable with the broiler 24, for barbecuing roasts, fowl, etc., is a revolvable support or carrier preferably consisting of a horizontal shaft 25 adapted to be positioned centrally of the grill and having spit elements 26 thereon for anchoring the meat thereto while being barbecued. This shaft is journaled at its front end in and constitutes a unit part of a supporting bar 27 detachably fitted at its ends in suitable straps 28 applied to the front wall of the housing, while its rear end is removably journaled in the rear wall of the housing. At its front end this shaft terminates in a crank or handle 29 for manually rotating it and turning the meat therewith. For the purpose of releasably retaining this spit-shaft in any given position during the barbecuing operation, the shaft 25 is provided adjacent its front end with a latching pin 30 adapted to interlock with one or another of an annular row of openings 31 formed in a circular plate 32 secured to the shaft-supporting bar 27. The latching and unlatching of this shaft-pin is accomplished by an axial displacement of the shaft fore and aft, respectively, and in this connection a cotter pin 33 is fixed on the shaft forwardly of the bar 27 to limit the inward displacement of the shaft, while the latching pin 30 is disposed rearwardly of the plate 32 and limits the rearward displacement of the shaft, there being sufficient axial play, however, to effect the latching and unlatching movements of the shaft.

A pan 34 is removably seated in the lower central portion of the grill between metallic straps 35 to receive whatever drippings there may be resulting from melting fat.

The warming shelves 17 are detachably fitted at the marginal top edge of the housing and for this purpose each shelf has spaced, depending flanges 36, 37 at its inner edge which embrace such top edge of the housing in the manner shown in Figure 3. The outer flange 37 is somewhat longer than the companion inner flange and is turned inwardly at its lower edge toward the adjoining grill-wall to positively retain the shelf in position and prevent its tilting downward.

I claim as my invention:

A cooking grill, comprising a housing forming a combustion and cooking chamber, fuel-receiving compartments spaced from the bottom of the housing and disposed at opposite sides of said chamber for movement therein toward and from each other, said compartments having grates at their opposing inner sides, and transversely-spaced supports disposed in the upper end of said housing on which said fuel-compartments are suspended for independent adjustable movement relative to each other, the upper ends of the fuel compartments having openings therein engaging said supports, the side walls of said housing and the opposing outer side walls of said fuel compartments having substantially alining draft openings therein.

EDWARD J. TATE.